No. 800,021. PATENTED SEPT. 19, 1905.
C. P. E. SCHNEIDER.
APPARATUS FOR LOADING ORDNANCE.
APPLICATION FILED OCT. 6, 1904.

2 SHEETS—SHEET 1.

No. 800,021. PATENTED SEPT. 19, 1905.
C. P. E. SCHNEIDER.
APPARATUS FOR LOADING ORDNANCE.
APPLICATION FILED OCT. 6, 1904.

2 SHEETS—SHEET 2.

UNITED STATES PATENT OFFICE.

CHARLES PROSPER EUGÉNE SCHNEIDER, OF LE CREUSOT, FRANCE.

APPARATUS FOR LOADING ORDNANCE.

No. 800,021. Specification of Letters Patent. Patented Sept. 19, 1905.

Application filed October 6, 1904. Serial No. 227,438.

*To all whom it may concern:*

Be it known that I, CHARLES PROSPER EUGÉNE SCHNEIDER, a resident of Le Creusot, Saône-et-Loire, France, have invented a new and useful Apparatus for Loading Ordnance, which is fully set forth in the following specification.

This invention relates to apparatus for loading ordnance, and has for its object an articulated or chain rammer for use with ammunition-cages or other ammunition-carriers.

Figure 1:
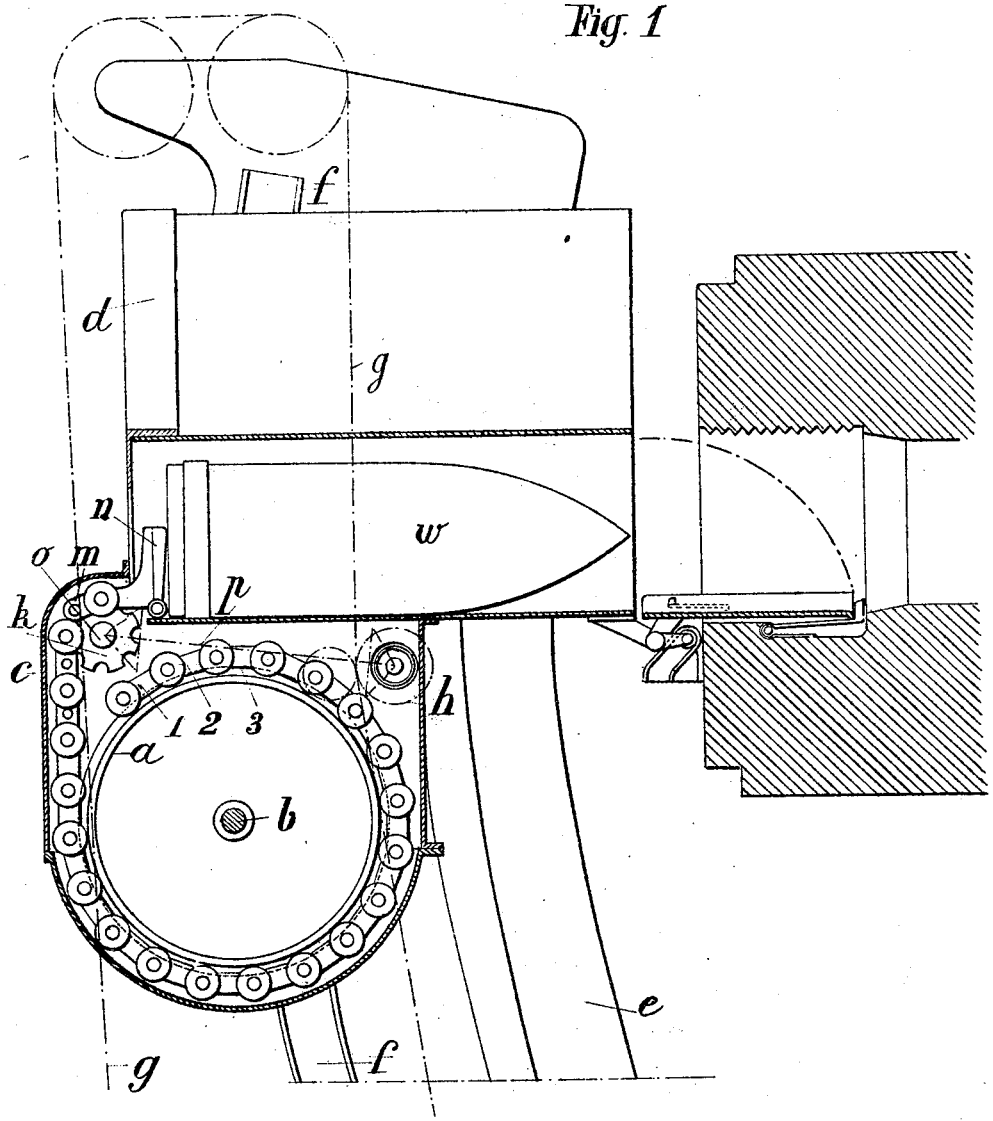
Figure 2:
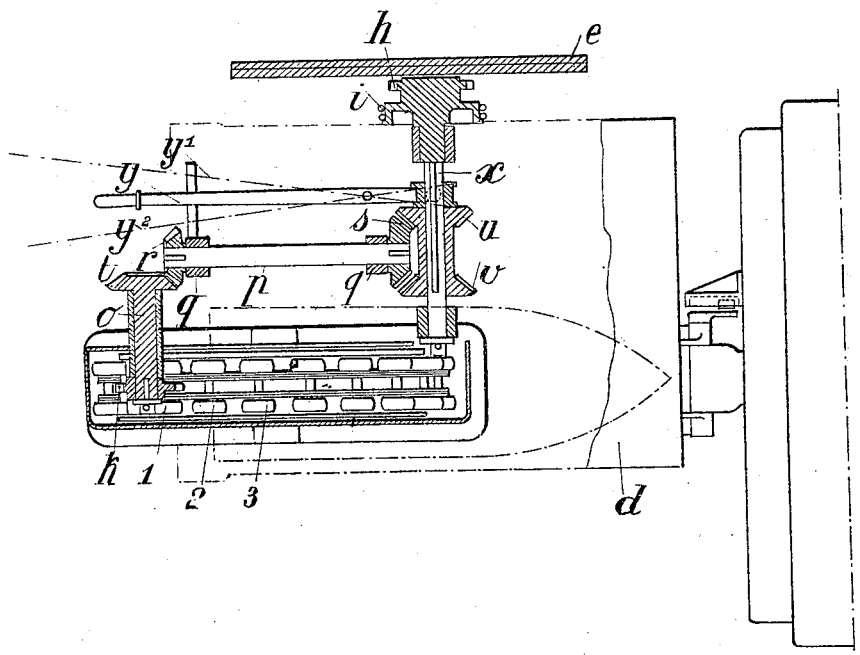

In the accompanying drawings, Figure 1 is an elevation showing the chain-rammer arranged in such a manner as to wind upon a drum situated beneath the carrier or cage of a turret ammunition-hoist, the length of the rammer being such that it may permit of bringing the projectile into its position in the charge-chamber of the gun through the intermediary of the powder charges, or it may be of a length sufficient for permitting the ramming of the projectile directly into position in the charge-chamber. Fig. 2 is a sectional plan showing the rammer-actuating mechanism connected, by way of example, to that of the cage.

The rammer is constituted by a series of articulated links 1 2 $m$, forming a chain terminating at one extremity in a pusher $n$ and hinged at its other extremity to a drum $a$, mounted upon a shaft $b$, that is carried in a casing forming a support $c$. This support is fixed at a suitable point to the ammunition-carrier, which in the example represented is a cage $d$.

In Fig. 1 $e$ designates the fixed cheek which carries the guiding-rails $f$ for the cage. $g$ is the endless chain of the ammunition-hoist, which chain gears with a pinion $h$, so as to permit of operating the rammer by the same transmission-gear that serves to elevate the cage. The pinion $h$, which during the ascent of the cage is locked by a brake $i$, Fig. 2, forming part of said pinion, is released by the slackening of this brake when the cage reaches the loading position. The rammer 1 2 $m$ is in constant engagement with one or more winding-surfaces, such as a chain-wheel $k$, mounted upon a shaft $o$, carried by the support $c$. A shaft $p$, mounted in two bearings $q$ in the support $c$, has keyed to its extremities two bevel-pinions $r$ $s$. The pinion $r$ gears with a bevel-pinion $t$, keyed upon a shaft $o$. A gear comprising two cones or bevel-pinions $u$ $v$ is mounted upon a shaft $x$, that carries a pinion $h$, (or in some cases a driving part, such as a pulley or crank,) which is independent of the ammunition-hoist. A lever $y$ permits of alternately bringing the double bevel-pinion $u$ $v$ into engagement with the pinion $s$. In the position $y'$ of this lever the bevel-pinion $u$ and the pinion $h$ (or other actuating part used in place thereof) are rendered operative, and the rammer, which is assumed to be in the position represented in Fig. 1, first unwinds for introducing the projectile $w$ as far as the entrance to the charge-chamber. By displacing the operating-lever $y$ in the opposite direction it is brought into the position $y^2$, and the other bevel $v$ is brought into contact with the bevel $s$, which then rotates in the opposite direction, so as to retract the rammer into the position represented in Fig. 1 and permit of the descent of a powder charge into the compartment of the cage previously occupied by the projectile. The rammer is then again actuated, as in the first instance mentioned above, and the powder charge $z$ thus introduced into the gun, said powder charge in its movement pushing in front of it the projectile $w$. A similar procedure takes place with regard to the second powder charge, which is pushed forward until the projectile is forced into its proper position. The rammer is then retracted and the cage lowered to the bottom of the turret in order to receive a fresh charge of ammunition.

What I claim, and desire to secure by Letters Patent of the United States, is—

1. In loading apparatus for guns, the combination of a munition-carrier, a flexible rammer supported on said carrier and means for operating said rammer.

2. In loading apparatus for guns, the combination of a munition-carrier, a chain-rammer supported on said carrier and means for operating said rammer.

3. In loading apparatus for guns, the combination of a munition-carrier, a flexible rammer supported on said carrier and comprising a series of articulated links yielding to flexure in one direction only and means for operating said rammer.

4. In a loading apparatus for guns, the combination of a munition-carrier, a flexible rammer on said carrier, a drum on which said flexible rammer may be coiled, and reversible actuating devices for operating said rammer.

5. In loading apparatus for guns, the combination of a munition-carrier, an articulated rammer, a drum on said carrier for receiving and delivering said rammer, a power-receiving device on said carrier and reversible power-transmitting means intermediate said devices and rammer to actuate the latter.

6. In loading apparatus for guns, the combination of a munition-carrier, actuating means for the same, a flexible rammer on said carrier, power-receiving means on said carrier engaging said actuating means, and reversible power-transmitting devices intermediate said power-receiving means and said rammer to actuate the latter.

7. In loading apparatus for guns, the combination of a munition-carrier, a rammer thereon comprising a series of articulated links, said rammer being flexible in one direction and resisting such flexure in the opposite direction and having at one extremity a pusher, a revoluble drum having a connection with the other end of the said rammer, a gear-wheel engaging said rammer, a driving member and reversible power-transmitting devices intermediate said driving member and said gear-wheel to actuate the latter and impart motion to said rammer.

In testimony whereof I have signed this specification in the presence of two subscribing witnesses.

CHARLES PROSPER EUGÉNE SCHNEIDER.

Witnesses:
   JEAN GOUNET,
   EDMOND BLAISE.